March 14, 1933.  W. J. SHAW  1,901,063
GUARD FOR WOOD HEEL TURNING MACHINES
Filed Dec. 23, 1927    4 Sheets-Sheet 1

Inventor
Wesley J. Shaw
By David Rines
Attorney

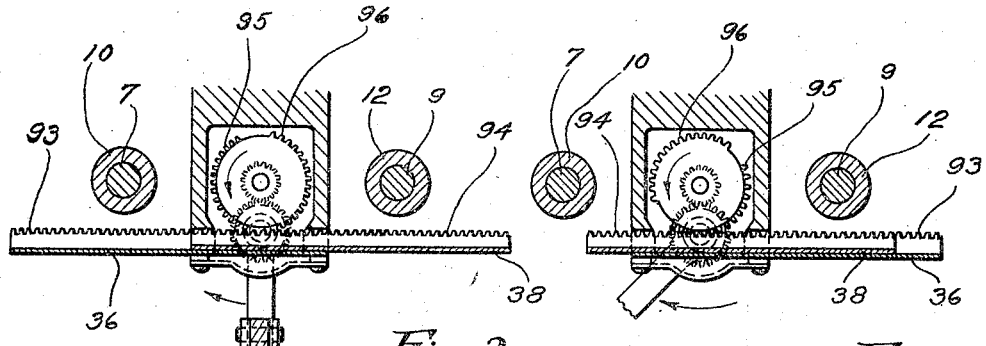
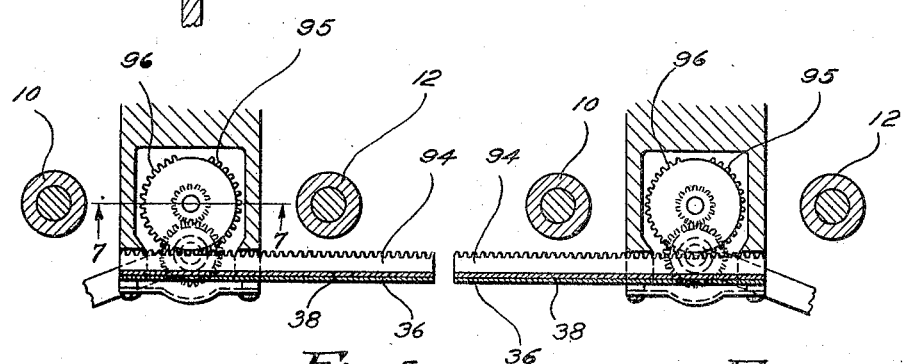
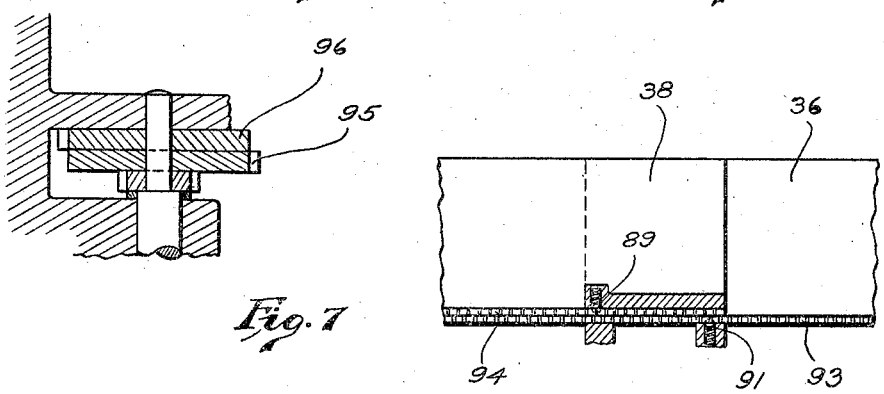

March 14, 1933.  W. J. SHAW  1,901,063
GUARD FOR WOOD HEEL TURNING MACHINES
Filed Dec. 23, 1927  4 Sheets-Sheet 3

Inventor
Wesley J. Shaw
By David Rines
Attorney

March 14, 1933. W. J. SHAW 1,901,063
GUARD FOR WOOD HEEL TURNING MACHINES
Filed Dec. 23, 1927 4 Sheets-Sheet 4

Inventor
Wesley J. Shaw
By David Rines
Attorney

Patented Mar. 14, 1933

1,901,063

UNITED STATES PATENT OFFICE

WESLEY J. SHAW, OF HAVERHILL, MASSACHUSETTS, ASSIGNOR, BY MESNE ASSIGNMENTS, TO UNITED SHOE MACHINERY CORPORATION, OF PATERSON, NEW JERSEY, A CORPORATION OF NEW JERSEY

GUARD FOR WOOD HEEL TURNING MACHINES

Application filed December 23, 1927. Serial No. 242,105.

The present invention relates to safety devices for protecting operators from accidental contact with cutting knives, and more particularly to guards for the cutters of wood-heel-turning machines.

Figure 1:
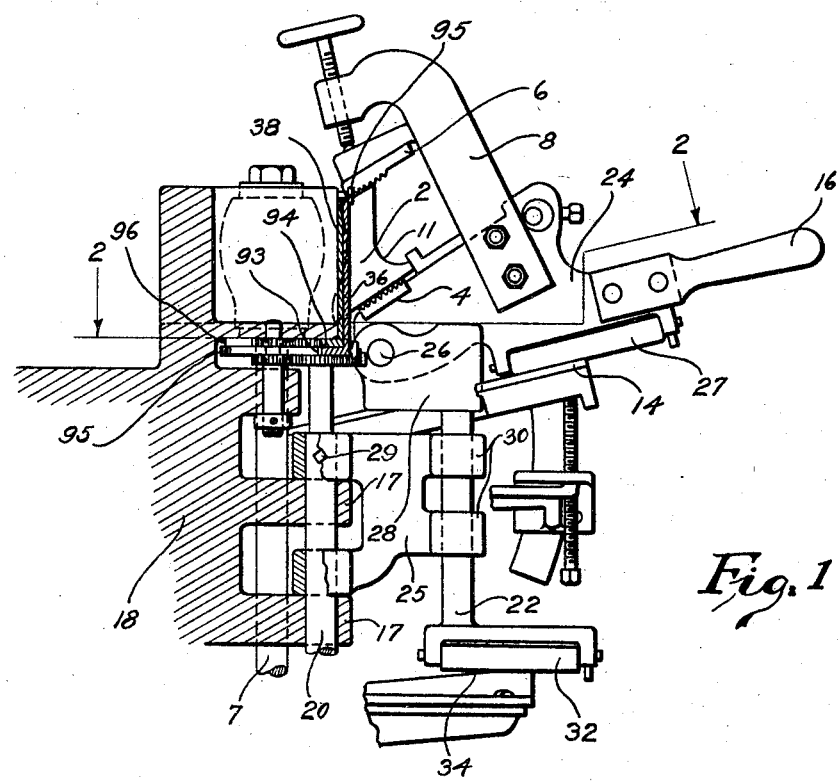
Figure 2:
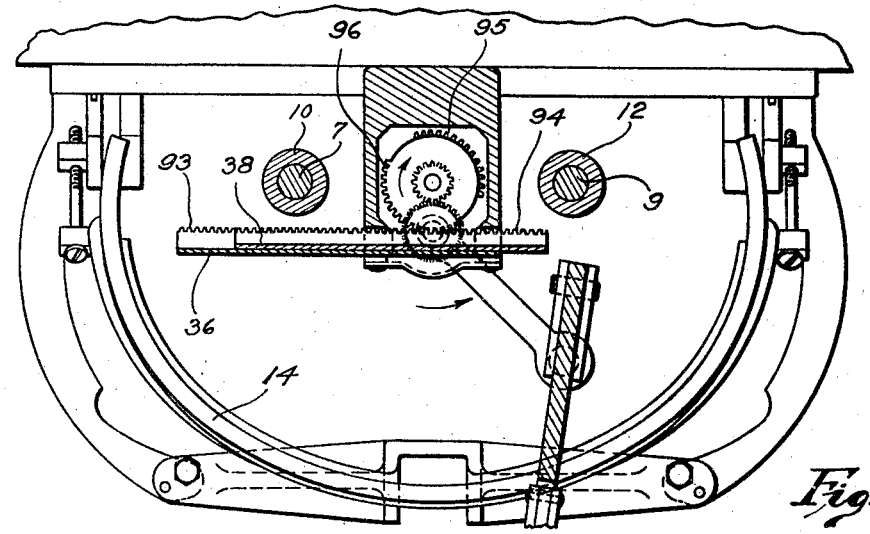
Figure 8:
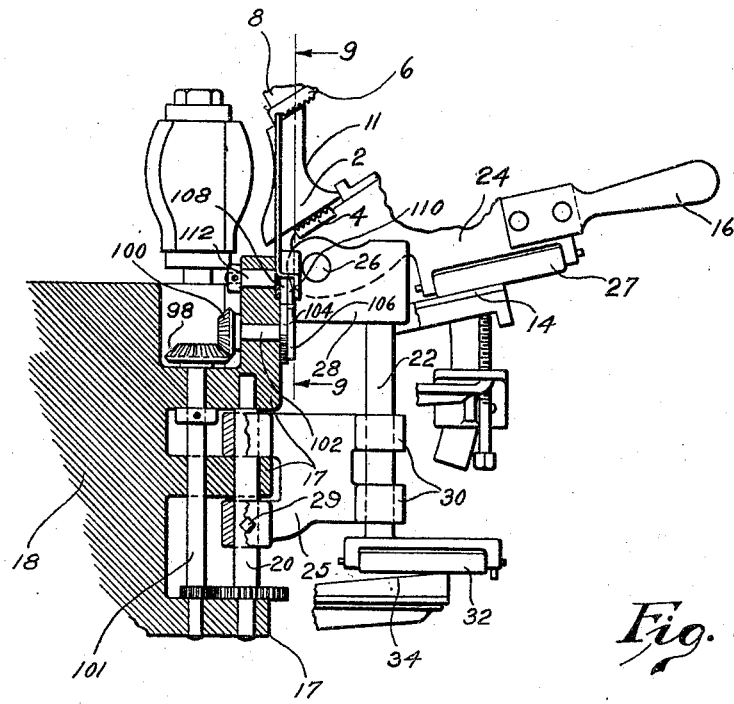
Figure 9:
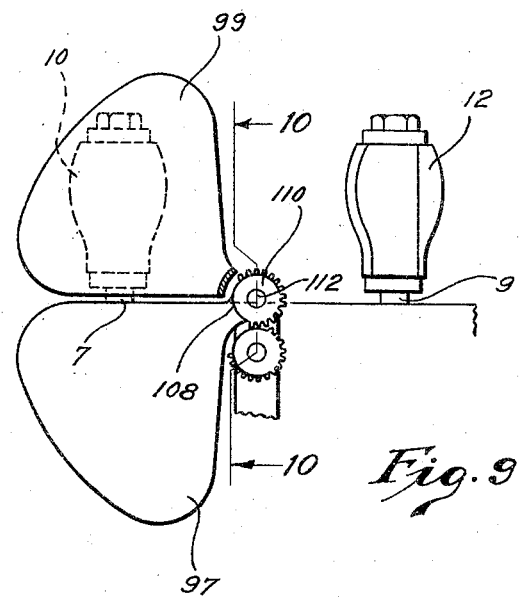
Figure 10:
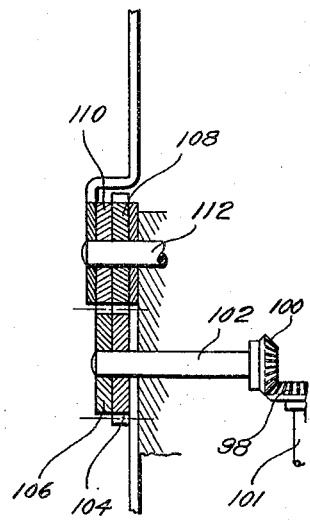
Figure 11:
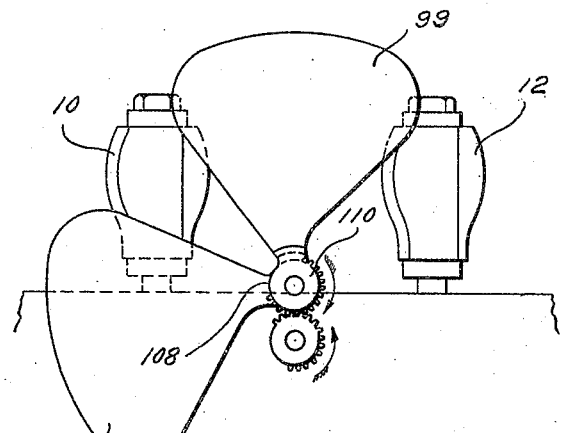
Figure 12:
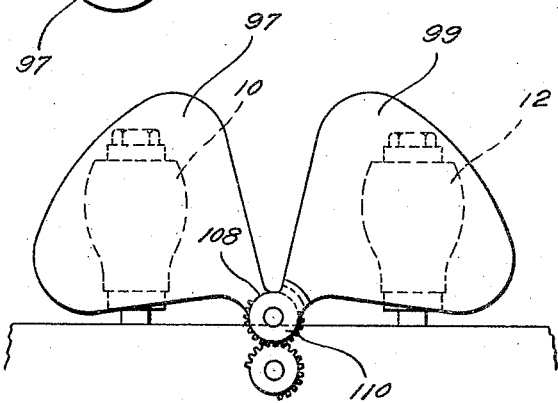
Figure 13:
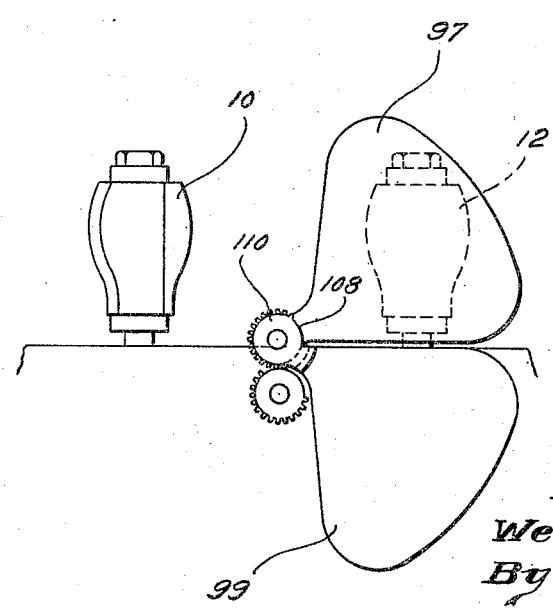

The nature and the objects of the invention will be explained in connection with the accompanying drawings, in which Fig. 1 is a vertical section of a portion of a wood-heel-turning machine showing one embodiment of the present invention; Fig. 2 is a section taken upon the line 2—2 of Fig. 1, looking in the direction of the arrows; Figs. 3 to 6, inclusive, are fragmentary views showing the parts in variously assumed positions; Fig. 7 is a section taken upon the line 7—7 of Fig. 5, looking in the direction of the arrows; Fig. 8 is a view similar to Fig. 1 of a modification; Fig. 9 is a section taken upon the line 9—9 of Fig. 8, looking in the direction of the arrows; Fig. 10 is a section taken upon the line 10—10 of Fig. 9, looking in the direction of the arrows; Figs. 11, 12 and 13 are views similar to Fig. 9 showing the parts in variously assumed positions; and Fig. 14 is a fragmentary view illustrating a detail of the embodiment of the invention illustrated in Figs. 1 to 7.

One of the operations connected with the manufacture of wood heels from wood-heel blocks or blanks 2 consists in shaping opposite sides of the block. To this end, the block is clamped between lower and upper jaws 4 and 6 of a clamp 8 that is mounted upon a jack 24, and its opposite sides are successively presented to the action of two horizontally-spaced, turning cutters 10 and 12 that rotate at high speed around vertical axes 7 and 9. In the drawings, the wood heel is illustrated as it appears after the cutters 10 and 12 have already performed their turning operations. Originally, however, at the time that it is first placed in the clamp 8, it is in the form of an unshaped wood block, except that the breast 11 has previously been grooved. The jack 24 may be swung by the operator horizontally over a curved track 14 by means of a handle 16. When the jack is swung in one direction, the wood block will be presented to the cutter 10; and when swung in the opposite direction, to the cutter 12. In order to permit of such swinging movement, the jack 24 is carried by a horizontally disposed arm 25 that is fixed by set screws 29 or the like to a rod 20. The rod 20 is journaled in vertically disposed bearings 17 of the base 18 of the machine, intermediately between the cutters 10 and 12. The jack 24 is fixed to a rod or shaft 22 that is journaled in bearings 30 of the arm 25. The arm 25, therefore, acts as a kind of link between the rods 20 and 22. It is fixed to the swinging rod 20 but permits free rocking movement of the rod 22 in order to permit swinging movement of the jack 24 about the axis of the rod 22 in the bearings 30. The jack is thus horizontally swingable with the rod 20 about the vertical axis of the latter from an intermediate position between the cutters, illustrated in Figs. 1, 3 and 8, toward either cutter 10 and 12; and after the jack has been swung all the way around to one cutter or the other, it is rocked about the vertically disposed rod or shaft 22, so as to present successive portions of the side of the heel block to the cutter and thus turn the whole side from the breast 11 outward.

As the jack 24 is swung by the operator over the track 14, a roller 27, that is attached to the jack 24, engages the track 14 to tilt the jack 24 about a horizontal pivot pin 26. The pivot pin 26 is carried by an arm 28 that extends out from the upper end of the rod 22. The pivot pin 26 is also movable vertically, so as to raise and lower the heel block as it is acted on by the cutters. Such vertical movement is permitted by having the rod 22 vertically movable in the bearings 30 of the arm 25. The vertical movement of the rod 22 is automatically effected during the swinging of the jack 24 by a roller 32 that is mounted at the lower end of the rod 22 so as to ride over a second curved track 34. As the jack is swung back and forth, first toward the cutter 10, and then toward the cutter 12, the track 34 causes the pivotal point 26 to rise and fall, and the track 14 causes the roller 27 to rise and fall. The ultimate composite movement, in connection with the shape of the cutters 10 and 12, determines the resulting shape of the heel. The machine, as so far described, is of well-known type, and the purpose of this brief description is merely to provide a setting for the features of novelty about to be described.

Though both cutters 10 and 12 are continuously in operation, only one cutter at a time is doing any actual cutting; and for a great portion of the time, the jack is in the intermediate position, neither cutter being then in use. At the time that the jack has been swung around to either the cutter 10 or the cutter 12, the operator's attention is concentrated on that particular cutter, and there is little danger, therefore, of his accidentally placing his hand in contact therewith, or otherwise becoming injured thereby. Whichever cutter is thus concentrated upon, however, the other cutter is receiving no such attention, and may cause injury, either to the operator himself or to a fellow workman. When the jack occupies its intermediate position, furthermore, both cutters are a source of accidental danger, and it is by no means an uncommon experience for even the most experienced turners to reach a hand absentmindedly toward one cutter or the other, while clamping and unclamping the blocks.

According to the present invention, therefore, novel means are provided for guarding against injury from both cutters when the jack occupies its intermediate position; and for guarding against injury from either cutter when the operator is presenting a heel block to the other cutter. Separate guards, one for each cutter, are preferred, the guards being interposed between both cutters 10 and 12 and the clamp 8 when the jack occupies its intermediate position, and one or the other guard being automatically movable out of its interposed position when the operator swings the jack over from the intermediate position toward the corresponding cutter. The guards are connected with the operating mechanism of the machine so that the swinging movement of the jack automatically effects movement of the guards. It is preferred to effect the movement of the guards from an end of the swinging rod 20.

In Figs. 1 to 7, inclusive, there are illustrated two guards 36 and 38 that reciprocate along straight, horizontal paths in parallel planes in front of the cutters and between the cutters and the jack. Normally, when the jack occupies its mid-position, as shown more particularly in Fig. 3, the guards 36 and 38 occupy their cutter-covering or protecting position, each in front of its corresponding cutter. When the jack is swung from the intermediate position toward the left-hand cutter 10, the guard 36 begins moving toward the right, as shown in Fig. 4, and finally exposes the cutter 10 to permit its shaping one side of the wood-heel block 2, as illustrated in Fig. 5. When the jack is moved in the opposite direction from its mid-position, toward the cutter 12, the guard 38 will begin, similarly, to move toward the right, as shown in Fig. 2, and will finally expose the cutter 12, as illustrated in Fig. 6, to permit it to operate on the opposite side of the block 2. In both cases, the cutter that is not doing any cutting is protected by the guards, the moving guard moving independently of the other guard. The guards are returned to their normal position when the jack is returned to its mid-position.

In order to effect the reciprocation of the guards, they are provided with lower racks 93 and 94, respectively, and the top of the rod 20 with meshing pinions 95 and 96, respectively. The pinions 95 and 96 are mutilated, as illustrated, so that one will engage its corresponding rack when the other does not, and vice versa. When the jack is swung over the track 14 by the handle 16, therefore, causing the rod 20 to swing therewith, the pinion 95 or 96, as the case may be, will actuate its corresponding guard, but without the other pinion actuating the other guard. When the rod 20 is returned to the mid-position, along with the jack 24, the guard will be returned to its normal or protecting position, again without actuating the other guard.

The guards may be pivoted, instead of reciprocated, as illustrated at 97 and 99 in the modifications of Figs. 8 to 13, so as to swing outward out of interposed position and inward into interposed position between the jack and the cutters. The rod 20 is there shown as geared at its lower end to a swinging rod 101 provided at its upper end with a bevel gear 98 that meshes with a bevel gear 100 upon one end of a horizontally disposed rock shaft 102. The other end of the rock shaft 102 carries fixed upon its two pinions 104 and 106 that respectively mesh with pinions 108 and 110 loosely mounted upon a shaft 112. The guard 97 is fast to the pinion 108 and the guard 99 to the pinion 110. The guards thus swing about the axis of the rock shaft 112. The pinions 104, 106, 108 and 110 are mutilated, as illustrated, to bring about the result heretofore described of exposing one cutter only without exposing the other. Further description is unnecessary, as the drawings are self-explanatory.

In both modifications, suitable stops, such as spring-pressed balls 89 and 91, may, if desired, be provided to prevent the guards from overrunning. The spring-pressed balls 89 and 91 are shown fitting into corresponding recesses on the inner ends of the guards to prevent the guards from moving out of position at a time when the mutilated gears do not engage the corresponding racks.

Other modifications, too, will occur to persons skilled in the art, and all such are considered to fall within the spirit and scope of the invention, as defined in the appended claims.

What is claimed is:

1. A safety device for machines having two horizontally spaced cutters for turning opposite sides, respectively, of a heel block, a clamp for holding the heel block, a jack upon which the clamp is mounted, and a member, carried by the frame on which the jack is swingable toward either cutter from an intermediate position between the cutters, comprising a separate guard for each cutter, the guards being relatively movable, and mechanism for supporting the guards and moving them into positions interposed between the cutters, respectively, and the clamp when the jack occupies the intermediate position, and for moving each guard, in a plane between the jack and the cutters, out of said interposed position, said mechanism comprising toothed gearing co-operating directly with said member on which the jack is swingable, and driven by swinging movement of the jack from the intermediate position toward either of the cutters, and arranged to drive that guard which is interposed between the jack and the cutter toward which the jack is swinging, out of interposed position between the jack and the last-named cutter.

2. A safety device for heel-turning machines having two horizontally spaced cutters for respectively turning opposite sides of a heel block, a clamp for holding the heel block, a jack upon which the clamp is mounted and a swinging vertical rod intermediately disposed between the cutters and to which the jack is fixed so as to swing with the rod about the axis of the rod from an intermediate position between the cutters toward either cutter, comprising a separate guard for each cutter, the guards being interposed between the cutters and the clamp when the jack occupies the intermediate position, and means guiding the guards to move in a plane between the jack and the cutters into and out of interposed position, toothed gears between the guards and the rod, whereby, when the jack is swung from the intermediate position toward either cutter, the corresponding guard is moved out of interposed position between the jack and the corresponding cutter, the gears being mutilated to effect the movement of each guard into and out of interposed position independently of the other guard.

3. A machine as defined in claim 1 in which the guards are moved into and out of interposed position by reciprocating each guard from a position in which it is interposed between the jack and one of the cutters into a position in which it is interposed between the jack and the other cutter.

4. A safety device for heel-turning machines having two horizontally spaced cutters for respectively turning opposite sides of a heel block, a clamp for holding the heel block, a jack upon which the clamp is mounted and a swinging vertical rod intermediately disposed between the cutters and to which the jack is fixed so as to swing with the rod about the axis of the rod from an intermediate position between the cutters toward either cutter, comprising two mutilated gears actuated by the rod as it swings, two separate guards having gear teeth for cooperating respectively with the mutilated gears, guiding mechanism for the guards constructed and arranged to cause them to reciprocate in parallel planes in response to the action of the cooperating gears, and the guards being interposed between the cutters and the clamp when the jack occupies the intermediate position, the mutilated gears being relatively so oriented, and having toothed portions of such angular extents that when the jack is swung from the intermediate position toward either cutter, the corresponding guard is moved out of interposed position between the jack and the corresponding cutter without exposing the other cutter.

5. A heel-turning machine as defined in claim 1 in which the movement of the guards is effected by pivoting them to swing outward out of interposed position and inward into interposed position.

6. A machine as defined in claim 1 in which each guard is pivotally mounted to swing about a horizontal axis from a position in which it is interposed between the jack and the corresponding cutter to a position below the corresponding cutter.

In testimony whereof, I have hereunto subscribed my name.

WESLEY J. SHAW.